United States Patent
Schwenger

(10) Patent No.: US 11,279,285 B2
(45) Date of Patent: Mar. 22, 2022

(54) EXTERIOR MIRROR WITH REDUCED FOLDING NOISE

(71) Applicant: MOTHERSON INNOVATIONS COMPANY LIMITED, London (GB)

(72) Inventor: Tobias Schwenger, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 169 days.

(21) Appl. No.: 16/511,821

(22) Filed: Jul. 15, 2019

(65) Prior Publication Data

US 2020/0017028 A1 Jan. 16, 2020

(30) Foreign Application Priority Data

Jul. 16, 2018 (DE) ...................... 10 2018 117 174.9

(51) Int. Cl.
 *B60R 1/06* (2006.01)
 *B60R 1/12* (2006.01)
 *G02B 7/198* (2021.01)

(52) U.S. Cl.
 CPC ................. *B60R 1/06* (2013.01); *B60R 1/12* (2013.01); *G02B 7/198* (2013.01); *B60R 2001/1215* (2013.01); *B60R 2001/1253* (2013.01)

(58) Field of Classification Search
 CPC ......... B60R 1/06; B60R 1/0617; B60R 1/074; B60R 1/076; B60R 1/12; B60R 2001/1216; B60R 2001/1253; B60R 2001/1215; G02B 7/198
 USPC ....................................................... 359/841
 See application file for complete search history.

(56) References Cited

U.S. PATENT DOCUMENTS

| 4,234,153 | A | * | 11/1980 | Chihara | B60R 1/076 248/475.1 |
| 4,626,085 | A | * | 12/1986 | Suzuki | G02B 7/1827 359/841 |
| 5,514,940 | A | * | 5/1996 | Okamoto | B60R 1/074 318/466 |
| 5,678,945 | A | * | 10/1997 | Fimeri | B60R 1/076 403/92 |

(Continued)

FOREIGN PATENT DOCUMENTS

| DE | 4429603 A1 | 2/1996 |
| DE | 112007000230 T5 | 2/2009 |

(Continued)

OTHER PUBLICATIONS

German Office Action dated Jan. 21, 2019 of the priority application DE 10 2018 117 174.9.

*Primary Examiner* — Ricky D Shafer

(74) *Attorney, Agent, or Firm* — Jones Day

(57) ABSTRACT

A manually foldable rearview device includes a head for holding at least one reflective element comprising at least one of a rearview mirror, a camera, and a display, a foot for attaching the head to a vehicle, a bearing bush connected rigidly to the foot and engaging the head for support and rotation of the head, the bearing bush including head and foot parts and a sliding disk which is connected axially displaceably to the bearing bush but not rotatably relative to the bearing bush by a suitable fixing, and a pretensioned spiral spring arranged around the bearing bush and pressing the head onto the foot.

10 Claims, 4 Drawing Sheets

(56) References Cited

U.S. PATENT DOCUMENTS

| | | | | |
|---|---|---|---|---|
| 6,371,619 | B1* | 4/2002 | Assinder | B60R 1/06 |
| | | | | 359/841 |
| 6,412,964 | B2* | 7/2002 | Hattori | B60R 1/06 |
| | | | | 359/871 |
| 6,880,940 | B1* | 4/2005 | Binfet | B60R 1/06 |
| | | | | 248/478 |
| 7,448,762 | B2* | 11/2008 | Su | B60R 1/076 |
| | | | | 248/478 |
| 8,800,950 | B2* | 8/2014 | Kawanishi | H05B 47/19 |
| | | | | 248/477 |
| 10,562,453 | B2* | 2/2020 | van Stiphout | B60R 1/074 |
| 2005/0168855 | A1* | 8/2005 | Fanelli | B60R 1/0617 |
| | | | | 359/881 |
| 2011/0228413 | A1* | 9/2011 | Sakata | B60R 1/076 |
| | | | | 359/841 |
| 2013/0120865 | A1* | 5/2013 | Toyama | B60R 1/06 |
| | | | | 359/841 |

FOREIGN PATENT DOCUMENTS

| | | | | |
|---|---|---|---|---|
| DE | 202012003399 U1 | 6/2012 | | |
| EP | 2698280 | * | 2/2014 | B60R 1/076 |

* cited by examiner

EXTERIOR MIRROR WITH REDUCED FOLDING NOISE

CROSS-REFERENCE TO RELATED APPLICATION

This application claims the benefit of foreign priority to German Patent Application No. DE 10 2018 117 174.9, filed Jul. 16, 2018, which is hereby incorporated by reference in its entirety for all purposes.

BACKGROUND

1. Field of the Invention

The present disclosure relates generally to a rearview device such as an exterior mirror, which is foldable with little noise, a vehicle with such a rearview device, and a method for assembling such a rearview device.

2. Related Art

Exterior mirrors for vehicles are typically designed to be foldable so as to be able to fold in the exterior mirrors for protective purposes, for example, in car washes or in narrow parking spaces. Creaking noises may arise when folding an exterior mirror with a manual folding function and are perceived to be disturbing. On the folding axis, the mirror head is pressed onto the mirror foot by means of a bearing bush and a spiral spring pretensioned therebetween. The bearing bush is in this case connected fixedly with the mirror foot and can only move radially and turn to a limited degree. The mirror head is clamped between spring and mirror foot and can be turned or folded about the folding axis in this plane. During folding, the spiral spring is compressed, since the mirror head has to be raised slightly for folding purposes in order to overcome a given preliminary resistance against undesired folding from the locked travel position of the exterior mirror. The spiral spring is twisted by the increased friction arising between spring and mirror head during lifting and turning. This force is transferred from the spring to the bearing bush. Noise may arise between the spring and the mirror head and between the spring and the bearing bush due to relative motion between the contact partners.

A hinge actuation apparatus for an exterior mirror of a vehicle, in particular a motor vehicle, is known from DE 20 2012 003 399 U1, having a mirror support, which is mounted or mountable rotatably on a basic axis which is fixable to the vehicle, and having a rotation and positioning means for rotating the mirror support about the basic axis and/or for positioning thereof in at least one rotational position on the basic axis, wherein the rotation and positioning means has at least one coupling element, which is pretensioned or pretensionable via at least one force element relative to the basic axis and is axially and/or radially displaceable on the basic axis against this pretension, and wherein at least one bearing element or similar intermediate element is provided between the coupling element and the force element, said bearing element or similar intermediate element being attached detachably to a retaining element of the rotation and positioning means via a transport connection.

DE 11 2007 000 230 T5 discloses an exterior vehicle mirror with a housing or framework with a neck with a first passage; an adapter matching this neck of the housing or framework, wherein the adapter has a second passage, which is aligned with the first passage in the housing or framework, and a contact surface for bearing against a reinforcing plate element of the vehicle, wherein an orifice in this reinforcing plate element is aligned with the first and second passages; a connecting bush, which is installed rotatably and with axial mobility through the first passage in the neck and the second passage in the adapter, wherein the connecting bush has a first end with at least one anchoring configuration, which extends radially outwards, wherein this first end of the connecting bush and the anchoring configuration are configured such that they fit through the orifice in the reinforcing plate element; and a resilient element between a protrusion, which is affixed to or integrated onto the connecting bush and the housing or framework in order to press the connecting bush inwards into the housing or framework, wherein at least one portion of the reinforcing plate element is clamped at the circumference of the orifice between the contact surface of the adapter and the at least one anchoring configuration of the connecting bush by the force of the resilient element, whereby detachment of the connecting bush from the orifice of the reinforcing plate element is prevented if the connecting bush is located in at least one predefined alignment with the orifice, and wherein the adapter moreover has the following: at least one first positioning configuration for connection with at least one second positioning configuration of the reinforcing plate element, whereby rotation of the adapter relative to the reinforcing plate element is prevented or limited; and first retaining configurations for cooperation with second retaining configurations of the connecting bush, in order to prevent or limit rotation of the connecting bush relative to the adapter, whereby rotation of the connecting bush is prevented or limited with regard to the predefined orientation of the reinforcing plate element.

Furthermore, DE 44 29 603 A1 relates to a holder for an exterior mirror of a commercial vehicle, with a tubular retaining arm, the end of which being remote from the vehicle is provided with a mirror and the end of which being close to the vehicle is mounted in a bearing block of metallic material connectable to the commercial vehicle so as to be swivelable about a swivel axis and lockable in various swivel positions, characterized in that the end of the retaining arm close to the vehicle is inserted directly as a swivel axis into a swivel bearing orifice in the bearing block, wherein a bearing bush of plastic material connected non-rotatably with the retaining arm is arranged between the swivel bearing orifice and the retaining arm to form a swivel bearing point with a plastic-metal bearing pairing between retaining arm and bearing block, wherein the bearing bush additionally has a ring projection which is provided on one of its axially facing flanks with latching teeth, which are releasably engaged with mating teeth on the bearing block.

SUMMARY

In one aspect, a manually foldable rearview device includes a head for holding at least one reflective element, such as a rearview mirror, and/or a camera and/or a display, and a foot for attaching the head to a vehicle, wherein the head is mounted in the foot so as to be foldable about an axis of rotation along a bearing bush, the bearing bush, which is connected rigidly to the foot, engaging in the head for support and rotation of the latter, wherein a pretensioned spiral spring arranged around the bearing bush presses the head onto the foot, wherein the bearing bush comprises head and foot parts, projecting radially relative to the axis of rotation, and a sliding disk, which is connected axially displaceably to the bearing bush, but not rotatably relative to the bearing bush, by a suitable fixing, wherein the foot part engages in the foot and the head is held rotatably with an appropriately shaped bearing engagement means between foot and sliding disk, and the spiral spring is clamped between head part and sliding disk without direct contact with the head such that, on folding of the head, the spiral spring is compressed but not rotated.

With the sliding disk, the rearview device, which may be a camera pod and/or an exterior mirror, has a sliding element in a folding axis (axis of rotation) which is connected in such a way that the creaking noises customary in the prior art are unable to arise on folding of the exterior mirror. The arrangement according to the invention prevents torsion from being transferred to the spiral spring during folding, since no relative motion can arise between sliding disks and spiral spring. The sliding disk between the (mirror) head and the spiral spring is to this end made from a material with a low coefficient of friction and thus from a material with good sliding properties, so that the (mirror) head can slip easily along the sliding disks on folding. The sliding disk fixed rigidly to the one-piece bearing bush separates the space in which the spiral spring is held from the space in which the (mirror) head is held by the (mirror) foot and the bearing bush. In this way, the spiral spring is secured against torsion, since in the absence of direct contact between (mirror) head and spiral spring during the folding movement of the (mirror) head no more torsion is transferred to the spiral spring, so markedly reducing creaking noise. The other noises caused by the movement between (mirror) head and sliding disk are likewise reduced to a (virtually) inaudible level due to the good sliding disk characteristics of the sliding disk, such that folding for example of the exterior mirror only generates a small amount of noise or, ideally, even no noise.

By fixing the sliding disk to the bearing bush, the resultant system of bearing bush, spiral spring and sliding disk additionally greatly simplifies assembling of the exterior mirror, since this mobile unit does not have to be assembled from individual parts under tension but rather can be inserted with corresponding pretension into the exterior mirror in ready-prefabricated form as a cohesive component.

The same applies to a camera pod or a combination of an exterior mirror and a camera pod. Hereinafter, for simplicity's sake, reference is made only to the exterior mirror, but it is not intended that the invention be limited thereto.

With the exterior mirror according to the invention, an exterior mirror is provided which at least generates less noise on folding than exterior mirrors according to the prior art.

In one embodiment, fixing of the sliding disk to the bearing bush is provided via first fixing elements on the bearing bush for engagement in appropriately complementarily shaped second fixing elements on the sliding disk. First and second fixing elements may for example be indentations, grooves, notches, clips, projections, hooks or otherwise configured latching fixings with corresponding mating pieces. Such fixing elements constitute reliable fixings for attaching the sliding disk to the bearing bush, into which the sliding disks can be simply snapped, latched, clipped, suspended or braced, and thus simplify this manufacturing step during production of the exterior mirror.

In a further embodiment, the bearing bush comprises a wall externally surrounding the sliding disk for accommodating a lower end of the spiral spring. In this way, the spiral spring acquires a slip-secure seat. Moreover, this combination configured as a U-shaped collar protects the sliding disk and spiral spring during assembling of the exterior mirror, such that damage or slippage into undesired positions is avoided during assembling or operation.

In a further embodiment, the fixing of the sliding disk is arranged on a surface of the bearing bush opposite the peripheral wall. In this way fixing of the sliding disks is provided in a particularly simple manner.

In a further embodiment, the sliding disk is made of a plastic material, preferably POM. Plastic materials, in particular POM, have a particularly low coefficient of friction. In this respect, it is advantageous as regards sliding properties for the surfaces of the plastic materials not to be perfectly smooth but rather to have a degree of surface roughness of between 1-4 μm.

In a further embodiment, the bearing bush comprises latching elements prefixing the spiral spring, these latching elements being provided for screwing into a corresponding contour in the mirror head during assembling of the exterior mirror. The latching elements simplify assembling of the exterior mirror, since the prefixing and assembling must no longer be achieved simultaneously, but can instead be performed in succession as separate operations, thereby greatly simplifying handling of the parts which are to be connected during assembling. Moreover, the number of parts to be connected is limited to three parts, namely (a) the prefixed system of bearing bush, sliding disk and spiral spring, (b) the mirror head and (c) the mirror foot. The latching elements may for example be snap hook connections.

In one embodiment, the bearing bush is made as a pressure die casting metal part. Pressure die casting is an effective method for producing specially shaped bearing bushes and it enables the use of metal as the material for the bearing bush, which is more robust than plastic parts. In another embodiment, the bearing bush may also be made of a plastic material, for example in the case of lighter rearview mirrors.

In a further embodiment, the rearview device comprises a lock against rotation acting against undesired turning or folding of the rearview device about the axis of rotation along the bearing bush, about which the head may be folded relative to the foot. This lock against rotation may be provided, for example, by increased resistance to rotational motion. The resistance may be produced, for example, in that, to start turning, the spiral spring has to be additionally compressed by means of a correspondingly shaped foot and/or head, in order to enable rotational motion.

In another aspect, a vehicle includes at least one rearview device. The term "vehicle" in this case may relate to vehicles of all types which use foldable exterior mirrors. Conventionally, vehicles have two exterior mirrors and the future tendency is towards two camera pods. The invention may, however, also relate to vehicles with one or more than two rearview devices. Fixing of the rearview device to the vehicle may be suitably performed by a person skilled in the art.

In another aspect, a method for assembling a rearview device includes providing a prefixed system consisting of bearing bush, sliding disk, and a spiral spring held between the head part of the bearing bush and the sliding disk; preassembling the prefixed system by means of one or more latching elements arranged on the bearing bush into the head to provide a combined component; screwing the combined component into the foot as far as a limit stop; releasing the prefixing of the system by screwing the combined component further past the limit stop; and reaching an end position, in which the released spiral spring presses the system into the foot.

The method may make it possible to provide an exterior mirror, which at least produces less noise than prior art exterior mirrors on folding. The same applies to a camera pod or a combination of an exterior mirror and a camera pod.

In one embodiment of the method, said method comprises the further step of folding the rearview device by rotating the mirror head about an axis of rotation along the bearing bush while at the same time the sliding disk and spiral spring are not moved.

In a further embodiment of the method, the step of folding can only be carried out once a lock against rotation has been overcome.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
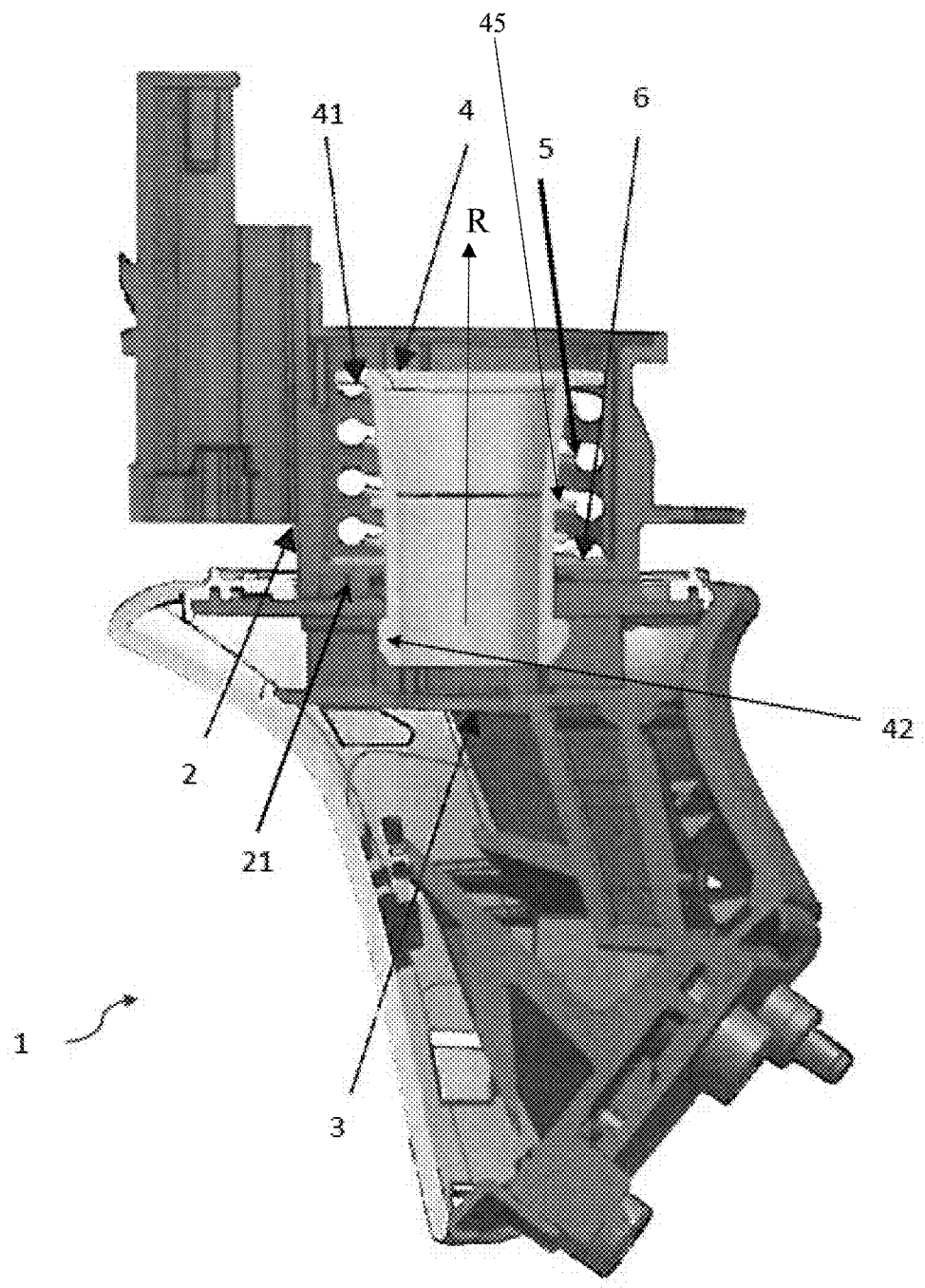
FIG. 1 is a schematic representation of one example of an exterior mirror.

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

FIG. 1 is a schematic representation of one example of an exterior mirror 1 including a mirror head 2 (head) for holding a rear-view mirror (not shown) and a mirror foot 3 (foot) for fixing the mirror head 2 to a vehicle 20. In this example, the mirror head 2 is mounted in the mirror foot 3 so as to be foldable about an axis of rotation R along a bearing bush 4, the bearing bush 4, which is connected rigidly to the mirror foot 3, engaging in the mirror head 2 for support and rotation of the latter. A pretensioned spiral spring 5 may be arranged around the bearing bush 4 and presses the mirror head 2 onto the mirror foot 3. The bearing bush 4 may include head and foot parts 41, 42, projecting radially relative to the axis of rotation R, and a sliding disk 6, which is connected axially displaceably to the bearing bush 4 but not rotatably relative to the bearing bush 4 by a suitable fixing 43.

The foot part 42 may engages in the mirror foot 3 and the mirror head 2 may be held rotatably with an appropriately shaped bearing engagement means 21 between mirror foot 3 and sliding disk 6, and the spiral spring 5 may be clamped between the head part and the sliding disk 6 without direct contact with the mirror head 2. As a result, upon folding of the mirror head 2, the spiral spring 5 may be compressed but not rotated. The sliding disk is in this case made from a slidable plastic material, preferably POM. The bearing bush may, for example, be manufactured as a pressure die casting part of metal or, in the case of lighter rearview mirrors, also from plastic material. In this case, the rearview device 1 may include a lock against rotation acting against undesired turning or folding of the mirror head 2 relative to the mirror foot 3 about the axis of rotation R along the bearing bush 4.

Figure 2:
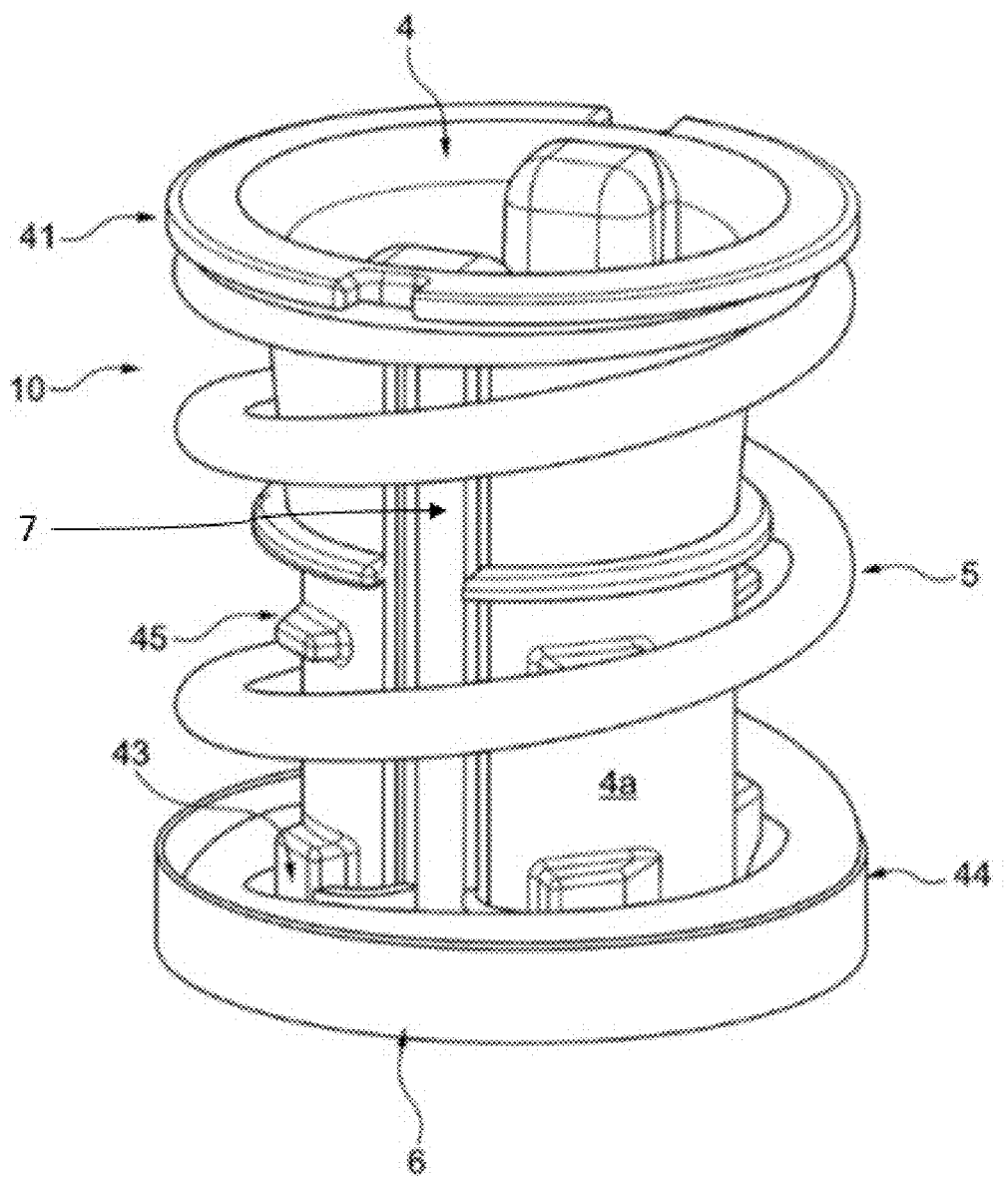
FIG. 2 is a schematic representation of an example of a system including a bearing bush, sliding disks and spiral spring.

FIG. 2 shows a schematic representation of an example of the system 10 including a bearing bush 4, a sliding disk 6 and a spiral spring 5. Fixing 43 of the sliding disk 6 to the bearing bush 4 is here provided via first fixing elements on the bearing bush 4 for engagement in appropriately shaped second fixing elements on the sliding disk 6. The first and second fixing means are represented symbolically by the reference sign 43. Axial compression of the spiral spring 5 is possible, since the sliding disk 6 may move axially along the rail 7 shown in FIG. 2, in which the sliding disk 6 may engage. The rail 7 extends axially from one end of the bearing bush 4 to the other end, wherein the rail 7 may prevent rotation of the sliding disk 6 relative to the bearing bush 4 by engagement of the sliding disk 6. The bearing bush 4 may further include a wall 44 externally surrounding the sliding disk 6 for accommodating a lower end of the spiral spring 5, where the fixing 43 of the sliding disk 6 is arranged on a surface 4a of the bearing bush opposite the surrounding wall 44. The bearing bush 4 may further include a plurality of latching elements 45 prefixing the spiral spring 5, these latching elements being provided for screwing into a corresponding contour in the mirror head 2 during assembling of the exterior mirror 1. In the end position reached of the sliding disk 6 and spiral spring 5 (as shown here), the latching element 45 no longer fasten the spiral spring 5.

Figure 3:
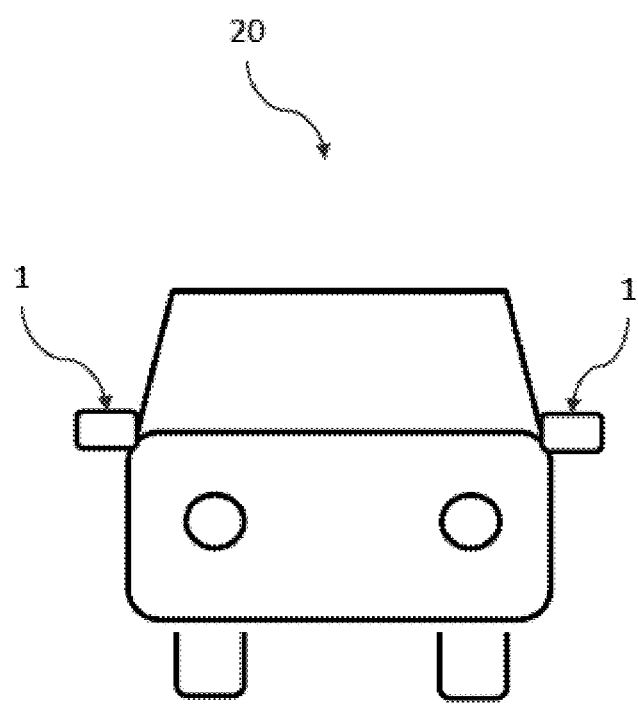
FIG. 3 is a schematic representation of an example of a front view of a vehicle with an example of exterior mirrors.

FIG. 3 shows a schematic representation of a front view of a vehicle 20 according to an example with two exterior mirrors 1 according to an example. While two exterior mirrors are illustrated, the invention may also relate to vehicles with one or more than two exterior mirrors. Fixing of the exterior mirror to the vehicle may be suitably performed by a person skilled in the art.

Figure 4:
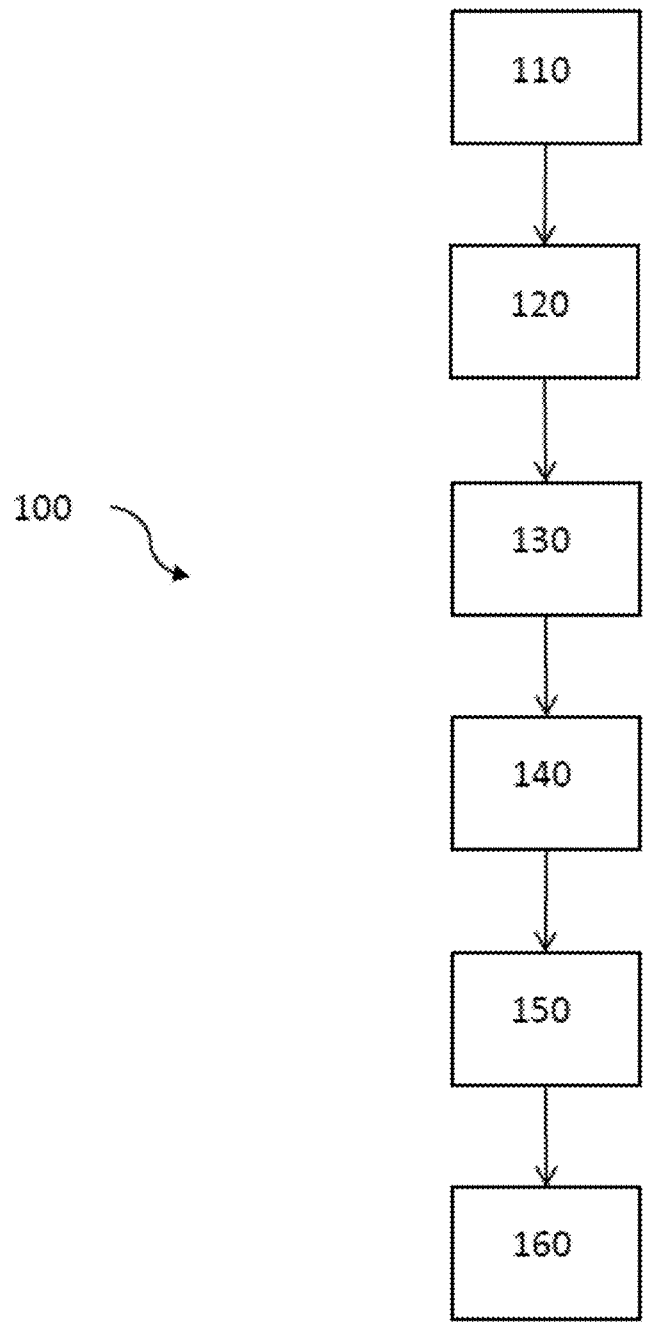
FIG. 4 is an example of a method for assembling the exterior mirror.

FIG. 4 shows an example of a method 100 for assembling the exterior mirror 1 including, providing 110 a prefixed system 10 including a bearing bush 4, a sliding disk 6 and a spiral spring 5 held between the head part 41 of the bearing bush 4 and the sliding disk 6 in a more compressed form than in the later end position, preassembling 120 the prefixed system by means of one or more latching elements 45 arranged on the bearing bush 4 into the mirror head 2 to provide a combined component 2, 10; screwing 130 the combined component 2, 10 into the mirror foot 3 as far as a limit stop, up to which point the system 10 remains prefixed; releasing 140 the prefixing of the spiral spring 5 by screwing the combined component 2, 10 further beyond the limit stop; and reaching 150 an end position, in which the released spiral spring 5 presses the system 10 into the mirror foot 3. The limit stop may, for example, be a mechanical limit stop in the form of a suitable protrusion out of the mirror foot 3. The suitable fixing means 43 may, for example, abut as a cam 43 against the limit stop, whereby the latching elements 45 are freely rotated. As a result, the spiral spring 5 then presses the mirror head 2 onto the mirror foot 3 until an end position is reached on the bearing engagement means 21 of the mirror head 2 to hold the mirror head 2 between the foot part 42 and sliding disk 6 of the bearing bush 4. The spiral spring is in this case configured so that, in its end position, it additionally has desired pretensioning for holding the mirror head 2 in the mirror foot 3. The pretensioning of the spiral spring 5 in the end position, however, less than the pretensioning of the spiral spring 5 in the prefixed position. In one example, the method further includes the step 160 of folding the exterior mirror 1 by rotating the mirror head 2 about an axis of rotation R along the bearing bush 4 while at the same time the sliding disk 6 and spiral spring 5 are not moved. In a further example of the method 100, the folding step 160 can only be carried out once a lock against rotation has been overcome.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE SIGNS

1 Exterior mirror according to the invention
2 Mirror head
3 Mirror foot
4 Bearing bush
4a Top/outside of the bearing bush
5 Spiral spring
6 Sliding disk
7 Rail
10 System consisting of
20 Vehicle
21 Mirror head bearing engagement means for holding the mirror head between the foot part and sliding disk of the bearing bush
41 Head part of the bearing bush
42 Foot part of the bearing bush
43 Suitable fixing
44 Wall surrounding the foot part in the form of a collar
45 Latching elements
100 Method according to the invention for assembling an exterior mirror according to the invention
110 Providing a prefixed system consisting of bearing bush, sliding disk and spiral spring
120 Preassembling the prefixed system by means of one or more latching elements
130 Screwing the combined component into the mirror foot as far as a limit stop
140 Releasing the prefixing of the spiral spring by screwing the combined component further beyond the limit stop
150 Reaching an end position, where the spiral spring presses the system into the mirror foot
160 Folding the exterior mirror by rotating the mirror head
R Axis of rotation around which the mirror head is rotated on folding relative to the mirror foot

What is claimed is:

1. A manually foldable rearview device, comprising:
   a head for holding at least one reflective element comprising at least one of a rearview mirror, a camera, and a display;
   a foot for attaching the head to a vehicle;
   a bearing bush connected rigidly to the foot and engaging the head for support and rotation of the head, the bearing bush comprising head and foot parts and a sliding disk which is connected axially displaceably to the bearing bush but not rotatably relative to the bearing bush by a suitable fixing; and
   a pretensioned spiral spring arranged around the bearing bush and pressing the head onto the foot,
   wherein the head is mounted in the foot so as to be foldable about an axis of rotation along the bearing bush,
   the head and foot parts of the bearing bush project radially relative to the axis of rotation, the foot part engages the foot, and the head is held rotatably with an appropriately shaped bearing engagement between the foot and the sliding disk, the spiral spring is clamped between head part and the sliding disk without direct contact with the head so that, in response to folding of the head, the spiral spring is compressed but not rotated, and
   the bearing bush further comprises latching elements prefixing the spiral spring, with the latching elements being provided for screwing the bearing bush into a corresponding contour in the head during assembling of the rearview device.

2. The rearview device according to claim 1, wherein the fixing of the sliding disk to the bearing bush is provided via first fixing elements on the bearing bush for engagement in appropriately complementarily shaped second fixing elements on the sliding disk.

3. The rearview device according to claim 1, wherein the sliding disk is made from a plastic material.

4. The rearview device according to claim 1, wherein the bearing bush is made as a pressure die casting metal part.

5. The rearview device according to claim 1, wherein the bearing bush is made from plastic material.

6. The rearview device according to claim 1, further comprising a lock against rotation acting against undesired turning or folding of the rearview device about the axis of rotation.

7. A vehicle, comprising at least one rearview device according to claim 1.

8. A method for assembling the rearview device according to claim 1, comprising:
   providing a prefixed system comprising the bearing bush, the sliding disk, and the spiral spring held between the head part of the bearing bush and the sliding disk;
   preassembling the prefixed system using one or more latching elements arranged on the bearing bush into the head to provide a combined component;
   screwing the combined component into the foot as far as a limit stop;
   releasing the prefixing of the system by screwing the combined component further beyond the limit stop; and
   reaching an end position, in which the released spiral spring presses the system into the foot.

9. The method according to claim 8, further comprising folding the rearview device by rotating the head about the axis of rotation along the bearing bush while at the same time the sliding disk the spiral spring are not moved.

10. The method according to claim 9, wherein the folding can only be carried out once a lock against rotation has been overcome.

* * * * *